(12) United States Patent
Haze

(10) Patent No.: US 11,443,256 B2
(45) Date of Patent: Sep. 13, 2022

(54) REAL-TIME MATCHING AND SMART RECOMMENDATIONS FOR TASKS AND EXPERTS

(71) Applicant: SAP SE, Walldorf (DE)

(72) Inventor: Oren Haze, Kfar Saba (IL)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 16/451,959

(22) Filed: Jun. 25, 2019

(65) Prior Publication Data
US 2020/0410427 A1      Dec. 31, 2020

(51) Int. Cl.
*G06Q 10/00*     (2012.01)
*G06Q 50/00*     (2012.01)
*G06N 5/00*      (2006.01)
*G06Q 10/06*     (2012.01)
*G06Q 50/20*     (2012.01)
*G06N 5/04*      (2006.01)

(52) U.S. Cl.
CPC ....... *G06Q 10/063112* (2013.01); *G06N 5/04* (2013.01); *G06Q 50/2057* (2013.01)

(58) Field of Classification Search
CPC .......................................... G06Q 10/00–50/00
USPC ................................................. 705/7.11–7.42
See application file for complete search history.

(56) References Cited

U.S. PATENT DOCUMENTS

| | | | |
|---|---|---|---|
| 9,132,349 B2 | 9/2015 | Haze et al. | |
| 11,144,853 B1* | 10/2021 | Waterman | G06Q 10/103 |
| 2007/0166672 A1* | 7/2007 | Morita | G09B 19/00 |
| | | | 434/118 |
| 2008/0103868 A1* | 5/2008 | Santos | G06Q 10/06 |
| | | | 705/7.14 |
| 2009/0299827 A1* | 12/2009 | Puri | G06Q 10/10 |
| | | | 705/7.42 |
| 2013/0066703 A1 | 3/2013 | Razy et al. | |
| 2014/0122144 A1* | 5/2014 | Cirpus | G06Q 10/06 |
| | | | 705/7.14 |
| 2014/0297616 A1* | 10/2014 | Zhao | G06Q 10/1053 |
| | | | 707/708 |
| 2015/0269244 A1* | 9/2015 | Qamar | G06Q 10/06398 |
| | | | 705/7.42 |
| 2016/0098667 A1* | 4/2016 | Ryan | G06Q 10/063112 |
| | | | 705/7.14 |
| 2020/0372338 A1* | 11/2020 | Woods, Jr | G06Q 10/063112 |

OTHER PUBLICATIONS

U.S. Appl. No. 16/113,770, filed Aug. 27, 2018, Ramon-Gonen et al.
U.S. Appl. No. 16/126,118, filed Sep. 10, 2018, Haze et al.
U.S. Appl. No. 16/126,144, filed Sep. 10, 2018, Haze et al.
U.S. Appl. No. 16/126,146, filed Sep. 10, 2018, 2018, Haze et al.
U.S. Appl. No. 16/430,565, filed Jun. 4, 2019, Haze et al.

(Continued)

*Primary Examiner* — Mustafa Iqbal

(74) *Attorney, Agent, or Firm* — Fish & Richardson P.C.

(57) ABSTRACT

User information for a particular user is accessed. Expert information for experts and training that is available in an organization of the particular user is accessed. One or more pattern matches between the user information and the expert information are determined. One or more expert recommendations are generated based on the one or more pattern matches and provided.

20 Claims, 4 Drawing Sheets

(56) References Cited

OTHER PUBLICATIONS

Drigas et al., "An expert system for job matching of the unemployed" Expert Systems with Applications 26,2, Feb. 1, 2004, 8 pages.

Linkedin.Com, "The Recommendations Feature in LinkedIn Learning" Jun. 11, 2019, [retrieved on Jun. 21, 2019], retrieved from: URL <https://www.linkedin.com/help/linkedin/answer/71923/the-recommendations-feature-in-linkedin-learning?lang=en>, 1 page.

Wikipedia Contributors, "Artificial Neural Network" available on or before Jan. 25, 2019, via Internet Archive: Wayback Machine URL <http://web.archive.org/web/20190125101740/https://en.wikipedia.org/wiki/Artificial_neural_network>, [retrieved on Jun. 21, 2019], retrieved from: URL <https://en.wikipedia.org/wiki/Artificial_neural_network>, 27 pages.

Wikipedia Contributors, "Association Rule Learning" available on or before Jan. 8, 2019, via Internet Archive: Wayback Machine URL <http://web.archive.org/web/20190108100330/https://en.wikipedia.org/wiki/Association_rule_learning>, [retrieved on Jun. 21, 2019], retrieved from: URL <https://en.wikipedia.org/wiki/Association_rule_learning> 7 pages.

Wikipedia Contributors, "Collaborative Filtering" available on or before Jan. 16, 2019, via Internet Archive: Wayback Machine URL <http://web.archive.org/web/20190116055834/https://en.wikipedia.org/wiki/Collaborative_filtering>, [retrieved on Jun. 21, 2019], retrieved from: <https://en.wikipedia.org/wiki/Collaborative_filtering>, 6 pages.

Wikipedia Contributors, "TF-IDF" Jun. 21, 2019, [retrieved on Jun. 21, 2019], retrieved from : URL <https://en.wikipedia.org/wiki/Tf-idf>, 6 pages.

\* cited by examiner

REAL-TIME MATCHING AND SMART RECOMMENDATIONS FOR TASKS AND EXPERTS

BACKGROUND

Human resources are one of the most valuable assets for organizations (for example, enterprises, foundations, or institutions). In the past, there has been a shortage of skilled and subject matter experts (for example, experts for high tech, finance, healthcare, or other special fields). The shortage increases dramatically in particular subject or topical matters, resulting in an urgent need for real expertise and deep knowledge for these and other fields. For example, in high-tech companies that are focused on software development and services, there is an additional need for experts specialized in topics such as databases, networks, algorithms, or artificial intelligence. Suitable experts may not always be available due to various reasons, including high-cost, timing, location, or travel. In addition, there may be other new and dynamic factors that need to be considered when staffing experts. Such factors/considerations that can also be affected by, for example, the General Data Protection Regulation (GDPR), foreign national regulations, or military and security clearances. Moreover, to become an expert, one needs to invest in training (for example, education, learning on the job, or other resources). Once a person becomes an expert in their field, needed expertise will continue to change dynamically. It can be very difficult to predict on what topic a person should invest in with on-going training or as a job focus.

An organization (for example, customers) needs members (such as employees or volunteers) with necessary competencies to achieve organizational goals and to stay competitive. Therefore, it is important for organizations to recruit and retrain experts with needed knowledge, skills, and expertise. Furthermore, with the continued and rapid development of technologies, experts themselves can also benefit from taking additional training or enrolling in courses to bridge learning gaps for specific tasks or projects. Organizations usually have an internal recruitment mechanism for expert searches, and sometimes purchase such services from outside commercial vendors.

SUMMARY

The present disclosure describes real-time matching and recommendations between tasks, requirements, projects, jobs, suitable experts, and optimized training.

In an implementation, user information for a particular user is accessed. Expert information for experts and training that is available in an organization of the particular user is accessed. One or more pattern matches between the user information and the expert information are determined. One or more expert recommendations are generated based on the one or more pattern matches. The one or more expert recommendations are provided.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the recommendation system can perform real-time identification, recommendation, optimization, personalization, and suggestion for suitable experts. Second, the recommendation system can identify learning gaps that are missing for an expert to perform a specific task, and recommend training programs to upgrade expert skills. Third, the recommendation system can create real-time and personalized recommendations for specific industries, verticals, or lines of business. Fourth, a knowledge base of users and expert information can be created, enabling expert recommendation and, additionally, analysis of user/expert acquirement, and user/expert landscapes. Fifth, the recommendation system can self-learn and improve recommendations over time. Sixth, the recommendation system can generate, based on a current context and knowledge base state for each respective job requirement and based on dynamic organization information and dynamic expert-information knowledge bases, specific recommendations for a large number of disparate organizations. Seventh, generated recommendations can be used in payments for expert recommendation service or other data instead of a conventional usage/transaction payment model associated with organizations or licensing.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
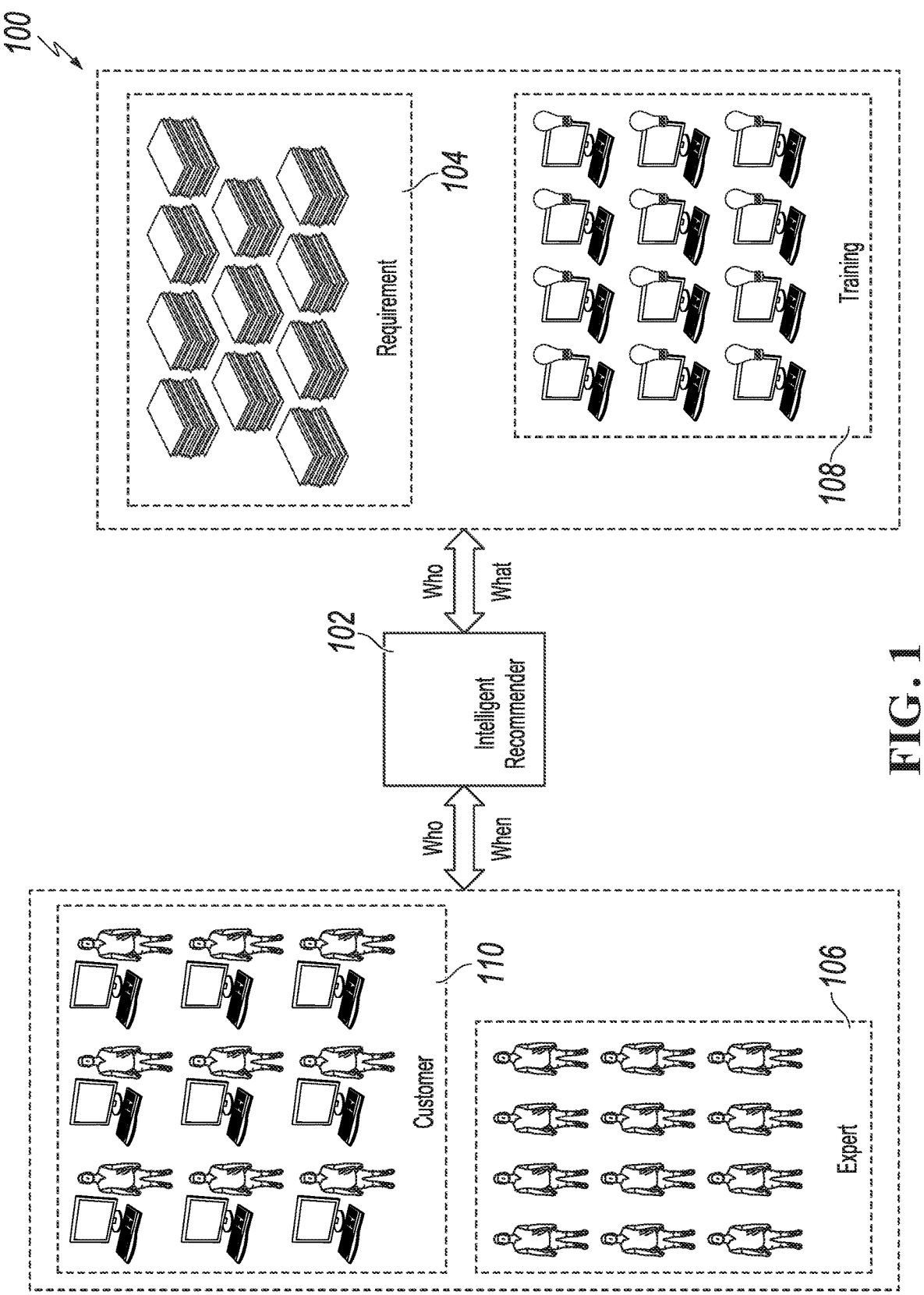
FIG. 1 is a high-level block diagram illustrating an example of a computing system in which an intelligent recommender recommends experts and training to organizations, according to an implementation of the present disclosure.

The following detailed description describes real-time matching of users and applications and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Acquiring suitable experts and training for a large organization can be complex, as many factors need to be taken into considerations, increasing the cost and potential return on investment (ROI) on the investment. Currently, organizations use an internal or commercial search engine to find experts and training for specific tasks and projects. For example, the organization may use a search engine from one or more software vendors. In some implementations, the search engine can come from multiple backend computing systems or computing platforms. Such a search engine can be very basic, without necessarily being able to correlate or adapt to changes which may occur within and outside the organization. A change in the need for a specific job or task can result in a change in suitable experts or prerequisite training for effective experts or training recommendations. For example, new experts and training need to be added to the organization on a routine basis as jobs, tasks, or needs of the organization change dynamically.

Further, it can be challenging for an organization to keep up-to-date regarding the latest and current experts and training that are available-/applicable to the organization's needs. For example, experts that are currently retained by the organizations may become unavailable or unqualified, while some currently used training may become obsolete and are deprecated. As such, an end user may not know which experts and training are available and which experts and training best suits the organization's needs, at a given point in time and in a given context. The user can be unaware that a given expert and training exists, since it may be difficult to locate an expert or be aware of a new training program. Unplanned, unsophisticated, rushed, or random expert/training selection may be inefficient and sometimes may even cause damage to an organization itself.

Existing solutions usually provide a list of experts or training available. However, such basic solutions do not necessarily correlate and adapt to the job or task needs that are dynamically changing. For example, researchers have proposed an expert system that can be used for evaluation of the unemployed at certain offered posts, by using some Neuro-Fuzzy techniques for analyzing the correlation between unemployed people and organizational profile data. However, this system does not address the task or project requirements problem, nor takes into consideration inputs like experts and training availability, costs, time, location, travel needs, GDPR regulations. Likewise, some commercial recruitment services such as LinkedIn™ has a "recommendations feature" which is based on current user's position and profile details (for example, current learning history and skills that the user market as interested for that user). This recommendation feature does not take into considerations those inputs above either, making it less comprehensive when making recommendations.

To solve the previously described problems, a recommendation system can be used for real-time matching and recommendations of suitable experts and needed training to organizations. Specifically, this disclosure presents a solution that creates a SMART recommendation mechanism that takes dynamic changes in a job or task of the experts and matches them with the jobs or tasks. The mechanism leverages its machine learning capabilities to recommend only suitable experts. In some implementations, the proposed mechanism also indicates and identifies the learning or training gaps that are missing or needed for a specific expert to perform a specific job or task. In this way, the proposed mechanism can leverage information or inputs such as market information, strategy roadmaps, experts in the originations, external experts, and automatic recommendations for relevant training based on experts needs. From a human resource perspective, the proposed mechanism transforms the existing solutions of learning or training hubs into adaptive, self-learning, and with real-time recommendations.

The recommendation system described in this disclosure has several advantages. First, it supports the GDPR by using organizations' data and identity to personalize recommendations. Further, the system can automatically provide recommendations and can find the appropriate parameters for each scenario. In addition, the system supports transactions of different sizes and format. Furthermore, the system can explain to organizations the reason they are getting the recommendations so the organizations can understand how the received recommendations were calculated, better influencing the organizations during the sale process and improving the system performance.

FIG. 1 is a high-level block diagram illustrating an example of a computing system 100 in which an intelligent recommender recommends experts and training to organizations, according to an implementation of the present disclosure. The intelligent recommender 102 can recommend an expert 106, or training 108 to an organization 110 according to a respective organization's current context and historical data, depending on the particular needs of the organization 110, by performing real-time, personalized, intelligent matching and recommendations 112 between a requirement 104 of a task or project and the expert 106, and between possible "up-skilling" training to the expert 106 or the organization 110 based on estimated needs. In some implementations, an expert 106 can be a professional who was formerly or is currently hired by the organization 110. In some implementations, the expert 106 can be a professional who is new to the organization 110. In some implementations, the training 108 can be a training program, a training course or otherwise available to the organization 110 and can be used by the expert 106 to upgrade their professional skills. The intelligent recommender 102 can make recommendations 112 based on algorithms that are configured to recommend a suitable expert or suitable training, to a particular organization 110, at the right time and place (that is, "who," "when," "what," "why" recommendations 112). Even though requirement 104, expert 106 and training 108 information is frequently changing, the intelligent recommender 102 can perform, at a given point-in-time, automatic matching of the organization 110 to expert 106, or matching training 108 to an expert 106 or an organization 110 in a given context, such as a given organizations' job or task requirement 104 and current information retrieved at the given point-in-time.

In some implementations, generated recommendations 112 can be used in payments for human resource services or other data instead of the conventional usage/transaction payment model associated with organizations or licensing. For example, a new payment model can leverage permitting "pay by accepted recommendations" (or similar). In these cases, if a recommendation 112 is followed and an expert is hired or retained, payments can be automatically assessed by the recommendation system 102 for the provided recommendation 112.

Figure 2:
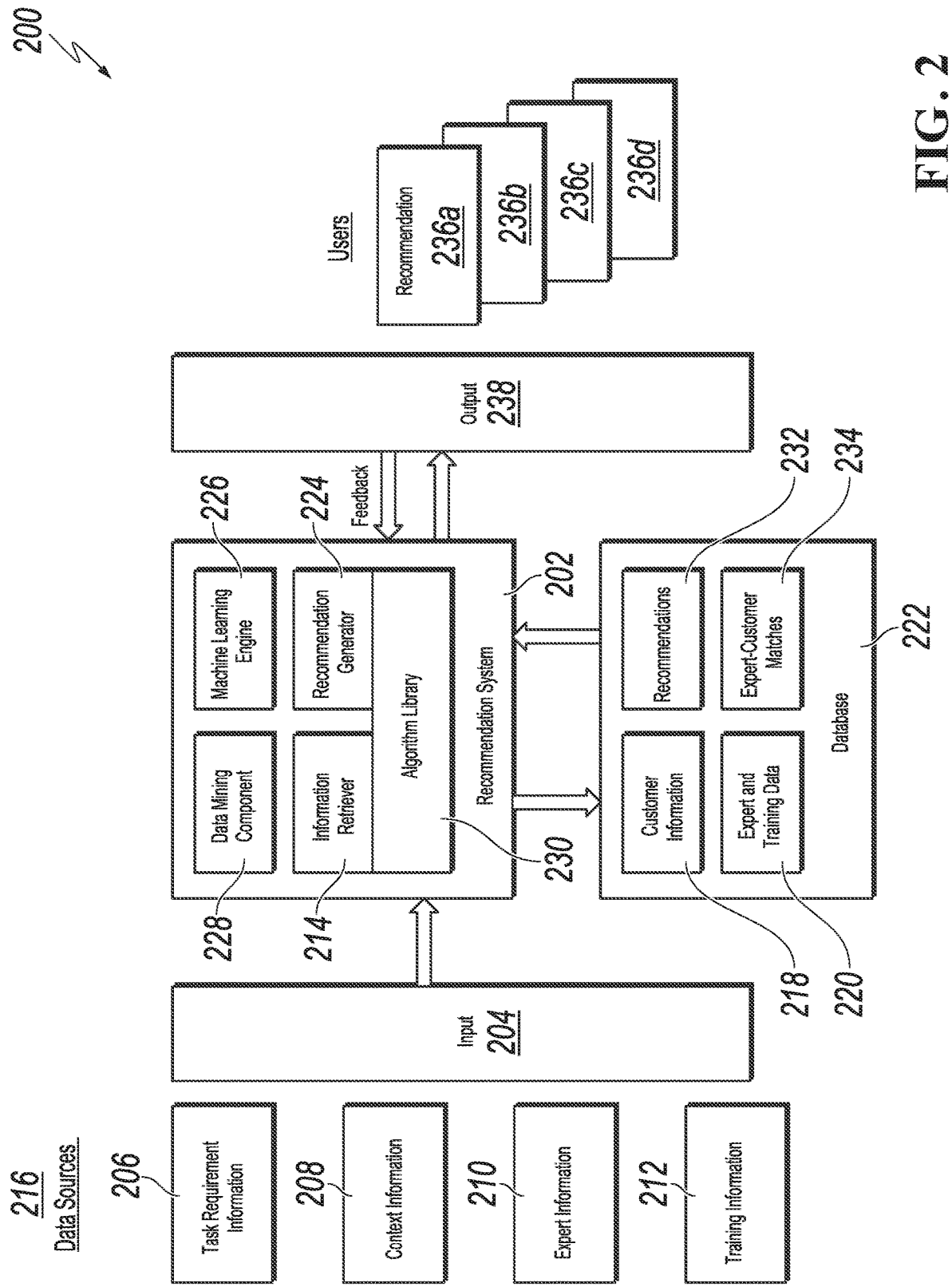
FIG. 2 is a block diagram illustrating an example of a computing system for recommending experts and training, according to an implementation of the present disclosure.

FIG. 2 is a block diagram illustrating an example of a computing system 200 for recommending experts and training, according to an implementation of the present disclosure. A recommendation system 202 can obtain input 204. In some implementations, for example, input 204 can include task requirement information 206, context information 208, expert information 210, and training information 212 that are available. Some or all of the input 204 can be obtained by an information retriever 214. The information retriever 214 can periodically (for example, every minute, hour, or day) request task requirement information 206, context information 208, expert information 210 and training information 212 from a list of known data sources 216. As another example, the information retriever 214 can automatically receive task requirement information 206, context information 208, expert information 210, and training information 212 from the data sources 216. For example, the data sources 216 can be configured to periodically provide task requirement information 206, context information 208, expert information 210, and training information 212. As another example, the data sources 216 can be configured to provide task requirement information 206, expert information 210 and training information 212 when task requirement information 206 or expert information 210 and training information 212 change in a data source 216, due to new, changed, or deleted information. In addition to obtaining external task requirement information 206, context information 208, or expert information 210 and training information 212, the recommendation system 202 can obtain organization information 218 or expert and training data 220 that is stored internally in a database 222 by the recommendation system 202, another system at a same organization as the recommendation system 202.

In some implementations, task requirement information 206 can include task requirement information metadata that can include, for example, categories, descriptions, required prerequisite knowledge, required prerequisite training, targeted user role, locations, availability, timelines, prerequisites, availability, timeline, or locations. In some implementations, task requirement information 206 can include information such as GDPR regulations or national regulations, security (for example, EU, China, military and security clearances), market information, and strategy roadmaps information. In some implementations, task requirement information 206 can include other information consistent with this disclosure.

Expert information 210 can include, for example, information, profile and history usage, availability, costs, time, location, or travel needs of known experts. Training information 212 can include, for example, agendas, prerequisites and requirements, availability, costs, time, or locations of known training, Expert information 210 and training information 212 received by the recommendation system 202 can be information for which the recommendation system 202 has been permitted to obtain, by a particular user, an organization, or an application owner.

Context information 208 can include context associated with obtained task requirement information 206 or expert information 210 and training information 212, such as a date, time, or location of data capture. As another example, context information 208 can represent current information for an organization, such as an organization's current location, or current date and time, such as date and time at which next recommendation(s) may be generated. Date or time information can represent a particular date or time periods, such as afternoon-time, morning-time, weekday, weekend, a particular season, end-of-quarter, or end-of-year. For example, location information can correspond to an organization's work location, a city, a state, or a country.

In some implementations, other types of context information 208 can include sentiment information or event information. In some implementations, event information can include a reminder of a due date or a request to complete a task (which may require or benefit from the use of certain applications), or a notification regarding new, changed, or removed experts and training that may be now available (or unavailable) to a user. In some implementations, sentiment information can include positive or negative information about an organization's use or preference for various experts and training. In some cases, a user's current or past choice of certain experts and training or types of experts and training can be viewed as a positive endorsement of those experts and training. Similarly, an organization's termination of a particular expert or abandonment of a particular training program due to selecting a replacement expert or training program can be viewed as a negative sentiment. In some implementations, positive or negative reviews of experts and training can be included in the sentiment information.

Obtained task requirement information 206, expert information 210 and training information 212 can be stored by the recommendation system 202, as organization information 218 or expert and training data 220, respectively. In some implementations, context information 208 that may have been associated with the task requirement information 206 or expert information 210 and training information 212 can be stored in the database 222 linked to respective associated data. In some implementations, a data mining component 228 can analyze the organization information 218 and expert and training data 220 to determine pattern matches between the organization information 218 and the expert and training data 220, for purposes of generating one or more expert or training recommendations for one or more organizations. In some implementations, a pattern match can be where organization information 218 for an organization matches expert and training data 220 for an expert or training which the organization has not hired or used (or not used within a predetermined period, such as a prior month).

For example, organization information 218 can indicate that an organization needs one or more experts to complete a specific task or a project. In some implementations, the data mining component 228 can determine one or more experts (who may or may not have been approached by the user) that can be recruited to complete the tasks. As another example, organization information 218 can indicate that an expert may be suitable for the task if she takes some additional training. In this way, the data mining component 228 can determine one or more other training programs, such as newer training programs that may be able to train the one or more experts to help them bridge learning gaps.

In some implementations, the data mining component 228 can determine experts that are going to be retired or otherwise deemed unsuitable for the task at a later date. In these cases, the data mining component 228 can identify replacement expert that process the same qualification, or other experts that have been previously identified as replacement experts. In some implementations, replacement expert information can be included in a subsequently generated recommendation, to be presented to users who are still using the to-be-retired experts.

Expert recommendations can be based on an organization's needs within an organization. For example, an organization may need an expert to perform certain tasks, have certain type of qualifications, or be available at a certain time. Need-specific recommendations can be provided for various roles, such as managers, salespeople, employees, or developers within the organization. In some implementations, the data mining component 228 can determine organization information 218 for the organization's projects, tasks, or requirements that are similar to a given organization. For example, expert usage information for organizations with the same (or similar) task requirement can be identified. The data mining component 228 can identify, for a given organization, experts that are recruited by organizations similar to the organization. Organization information 218 can include information that applies to a group of similar organizations or organizations that have the same or similar needs for a specific task. For example, a particular organization (or sub-organization, such as a department) can have certain defined task requirements. The data mining component 228 can determine that a given organization is included in the particular organization, and match one or more task requirements of the organization to experts (s) that can help satisfy such requirements.

The data mining component 228 can match experts to organizations based on at least in part on context information associated with the organization. For example, organization information 218 can include current or recent performance information for tasks or jobs needed by the organization. The data mining component 228 can identify experts that can achieve acceptable performance on the organization's current tasks. In some implementations, the recommendation system 202 can create a better matching and allows to optimize the recommendations by upgrading expert skills. For example, the recommendation system could recommend on the opposite direction to predict the experts what training they will likely need in the future. In such implementations, the data mining component 228 can also identify experts which could be recruited by the user if the user upgraded their requirements for a certain job or task. For example, a recommendation for expert Y to learn Z1 that will increase their "job attractiveness by 20%" and learn Z2 to increase their "job attractiveness by 10%". In this example, additional inputs to the recommendation system 202 are an expert's professional skills, soft skills (behavior "DNA" if available), experience, certificates, personal ratings (for example, feedback on prior jobs/task), location, or availability. For example, if the most suitable expert/s are not available, then the system will recommend an available expert and needed "learning/upskilling" and traveling (if needed) considerations and costs. The system will score each recommendation, based on different factors like cost estimations (for example, travel, time and quality, expert/s' ratings, missing skills an expert/s need to learn/add/upgrade before performing the task/job).

Determined expert-organization matches 234 can be stored in the database 222, and used by a recommendation generator 224 to generate one or more recommendations 232 (which can also be stored in the database 222). In some implementations, recommendations 232 can include a description of the recommended expert and recommended training and why the expert and the training are being recommended to a particular organization. Recommendations 232 can be real-time and personalized for users in specific organizations (for example, to use for specific industries, verticals, or line-of-business).

Recommendations 232 can be a reminder for an organization to use an expert or training which an organization has previously used. Recommendations 232 can be for an expert which an organization has considered, but not hired, or an expert for which an organization has access (that is, permitted to contact). As another example, recommendations 232 can be for an expert for which an organization does not currently have access, but for which a user can obtain access (for example, has permission to access). In some implementations, recommendations 232 can include a description of how the organization can obtain access to the recommended expert.

Generated recommendations 232 can be presented to organization(s) (for example, as presented recommendations 236a, 236b, 236c, and 236d (hereinafter, presented recommendation(s) "236"). In some implementations, presented recommendation(s) 236 can include a link or other mechanism that enables the organization to reach, contact, or access and recruit the recommended expert. In some implementations, a presented recommendation 236 can be presented in different channels, such as in an expert finder, an expert launch pad/dashboard, email, on various types of user devices (for example, mobile devices, desktop devices, or other computing devices or messaging platforms). In some implementations, presented recommendation(s) 236 for an expert can be presented to an organization while an organization is using a particular, other application, while in a certain location, at a next login time, or upon other scheduling.

The data mining component 228, information retriever 214, and recommendation generator 224 can perform processing at various times and in response to various triggers. In general, processing by the recommendation system 202 can be ongoing, either periodic or event-driven (for example, to account for potentially frequent changes in task requirement information 206, expert information 210 and training information 212). In some implementations, the recommendation system 202 processing can be performed periodically (for example, every minute, every hour, every day, or in response to changed data or newly received data). As previously described, a large organization may have many thousands of jobs or requirements and many thousands of potential candidates for those jobs and requirements, resulting in dynamic task requirement information 206 and expert information 210 and training information 212 data sets. Without frequent expert recommendation generation, organizations may not be using best-suited experts for their recruitment needs or an organization's benefit. In some implementations, the recommendation system 202 processing can be performed in batch, such as by periodically obtaining task requirement information 206, expert information 210 and training information 212 for all known experts and users, and automatically generating new recommendations based on a current state of the database 222. As another example, the recommendation system 202 can generate recommendations for particular organizations based on jobs and tasks needed to be performed by organization's organization, such as the organization logging in, starting a dashboard or other application, or being at a particular location.

After one or more recommendations 232 are presented as presented recommendations 236, feedback 240 associated with the presented recommendations 236 can be provided to the recommendation system 202. The recommendation system 202 is configured to learn constantly and to adapt based on the feedback 240 associated with the recommendations 236 and usage data.

Feedback 240 can include, for example, indications of whether any presented recommendations 236 were acted upon, how long it took for a response to the presented recommendations 236, or whether one or more presented recommendations 236 were dismissed without being acted upon. For a recommendation 236 where a recommended expert was recruited or hired, the feedback 240 can include performance information for the acted-upon expert so that the recommendation system 202 can determine how well a recommended expert has performed following their selection based on a recommendation 236. For recommendations 236 where a recommended training program was installed or used, the feedback 240 can include usage information for the acted-upon training program, so that the recommendation system 202 knows how much a recommended training program was used after selection of a recommendation 236. In some implementations, the feedback 240 can be used by a machine learning engine 226 to tailor future recommendations 236.

As a platform provider with many organizations with unique knowledge of all its organizations' historical usage, the machine learning engine 226 considers historical fluctuations of all relevant organizations based on different algorithms. It additionally identifies organizations which are similarly based on their profiles (tasks/projects/jobs), as well similar expert/s profiles (for example, experience, skills, ratings, expertise, or location) and previous/historical jobs/tasks/projects usage and leverages these data for better prediction. In some implementations, the recommendation generator 224 can be configured to consider multiple types of pattern matches and to use various algorithms to determine which recommendations 232 to generate. Algorithm outputs can be aggregated to determine final recommendations 232. In some implementations, each type of pattern match can have a corresponding weight, where weights for types of pattern matches or algorithms can be adjusted based on the received feedback 240.

For example, certain types of presented recommendations 236 (such as, formats and channels) that are acted upon at a higher frequency than other types of presented recommendations 236 can be used more often than recommendation types that are acted upon less-frequently. As another example, if less than a certain predefined percentage of organizations accept a recommendation 232 for a particular expert or particular training, recommendations 232 for that expert or that training can be reduced or eliminated in the future. As a specific example, if less than two percent of organizations act upon a presented recommendation 236 for a new expert or a new training, the machine learning engine 226 can send information to the recommendation generator 224 so that the expert or that training is not recommended (or recommended even less frequently or only recommended based on particular criteria) in the future. Conversely, if presented recommendations 236 for a new expert or training are accepted at a rate of 90%, the machine learning engine 226 can send information to the recommendation generator 224 so that the new expert or new training is recommended to more users more often.

The data mining component 228, the information retriever 214, the recommendation generator 224, or the machine learning engine 226 can use an algorithm library 230 for processing. For example, pattern-matching algorithms, machine-learning algorithms, or other mathematical algorithms can be accessed by recommendation system 202 components from the algorithm library 230.

Unlike existing solutions (for example, recommendation mechanisms based on Collaborative Filtering (CF), Association Rules (AR), Artificial Neural Networks (ANN)), the proposed recommendations system 202 combines several recommendations approaches together and aggregates the results. In some implementations, the algorithm library 230 includes several recommendation algorithms, like Collaborative Filtering (CF), Association Rules (AR), Artificial Neural Networks (ANN), Term Frequency-Inverse Document Frequency (TF-IDF), Optimized Recommendations based Basket Size (ORBS) and others. In some implementations, the recommendation generator 224 can aggregate and combine the different recommendation algorithms scores, user feedback, and the business priority together. In addition, the aggregation algorithm updates the recommendation algorithms weights frequently based on the end user feedback. Thus, enabling the system to learn and adapt continuously. In addition, the system will return recommendations based on the request it gets. Different recommendation models will be built according to the data the system gets. The core algorithms are based on transactional data. In cases where the organization provides more data such as user id, payment method, location, time, organization demographic data, or product metadata the system will use the additional data to improve recommendations 232. The system collects the users' feedback to each presented recommendation 236 (for example, accepted/rejected). During runtime, the system will return recommendations 232 according to one or more of a received recommendation request and a combined result of different recommendation models, user feedback, or business priority.

Other types of output 238 can be produced by the recommendation system 202. For example, the recommendation system 202 can expose organization information 218, expert information 210 and training information 212, recommendations 232, and expert-organization matches 234 to privileged users, for analysis and understanding of the organization and expert landscapes and recommendation history. In some implementations, recommendations 232 can include information on recommendation acceptance rates. In some implementations, exposed information from the database 222 can be provided in a report or data feed format (for example, for analyst viewing or processing by one or more systems).

Figure 3:
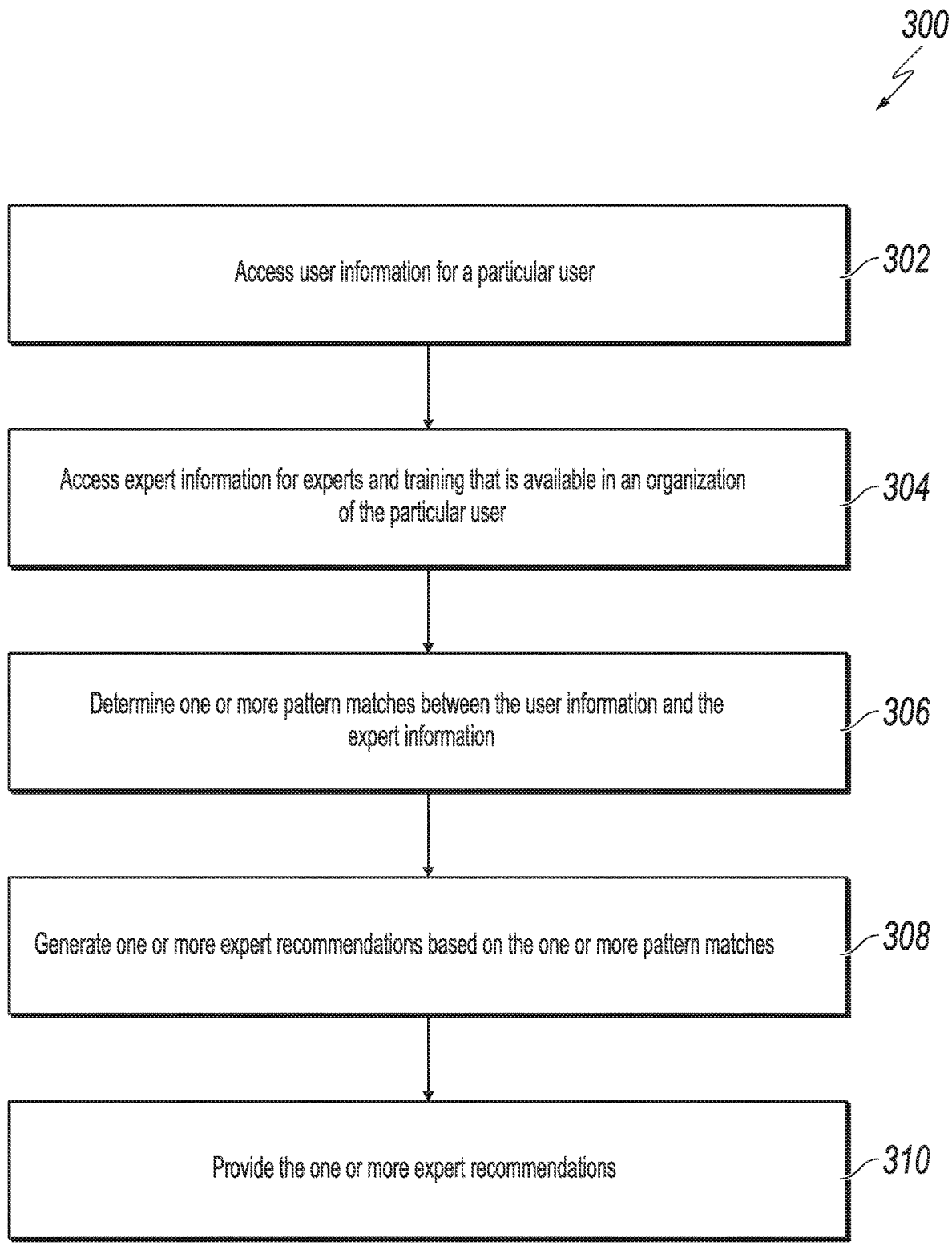
FIG. 3 is a flowchart illustrating an example of a computer-implemented method for real-time matching of organizations and experts, according to an implementation of the present disclosure.

FIG. 3 is a flowchart illustrating an example of a computer-implemented method 300 for real-time matching of organizations and experts, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or any order.

At 302, user information for a particular user is accessed. In some implementations, the user information includes context information, organizational data for the particular user, demographic data, expert or training usage information, a user role for the particular user, project participation data, user profile information, user activity data, user preferences, a current location of the particular user, or a current time at which a recommendation can be presented to the particular user. After 302, method 300 proceeds to 304.

At 304, expert information for experts and training that is available in an organization of the particular user is accessed. In some implementations, the expert information includes one or more of, for example, an expert category, expert description, expert prerequisite information, expert functionality, expert availability, expert cost, expert preferences, expert profile, and expert location. Other values consistent with this disclosure can also be considered expert information and the provided examples are not meant to limit the expert information in any way. After 304, method 300 proceeds to 306.

At 306, one or more pattern matches between the user information and the expert information are determined. In some implementations, at least one pattern match is a match between the user information and a predefined pattern relating to expert data. In some implementations, at least one pattern match is a match between the expert information and a predefined pattern relating to the user information.

In some implementations, determining the one or more pattern matches includes determining an expert that matches historical expert usage for the particular user. In some implementations, determining the one or more pattern matches includes determining an expert to which the particular user has access. In some implementations, determining the one or more pattern matches includes determining an expert that matches a requirement of the particular user.

In some implementations, determining the one or more pattern matches includes determining an expert that matches some of the user information but lacks knowledge or training to perform a specific task for the particular user; and including a suggestion in a provided expert recommendation that the expert obtain the knowledge or the training. After 306, method 300 proceeds to 308.

At 308, one or more expert recommendations are generated based on the one or more pattern matches. In some implementations, the one or more expert recommendations are generated in response to a trigger. In such implementations, the trigger comprises one of a change in the user information, a change in the expert information, a change in training information, or a start of a periodic interval at which to automatically process the user information, the expert information, and the training information. After 308, method 300 proceeds to 310.

At 310, the one or more expert recommendations are provided. In some implementations, method 300 further includes storing the one or more pattern matches.

In some implementations, method 300 further includes receiving feedback related to one or more provided expert recommendations; and adjusting a pattern recognition engine to improve generation of future expert recommendations.

In some implementations, method 300 further includes assessing a payment for the one or more expert recommendations if a particular expert recommendation of the one or more expert recommendations is followed by the organization. After 310, method 300 stops.

Figure 4:
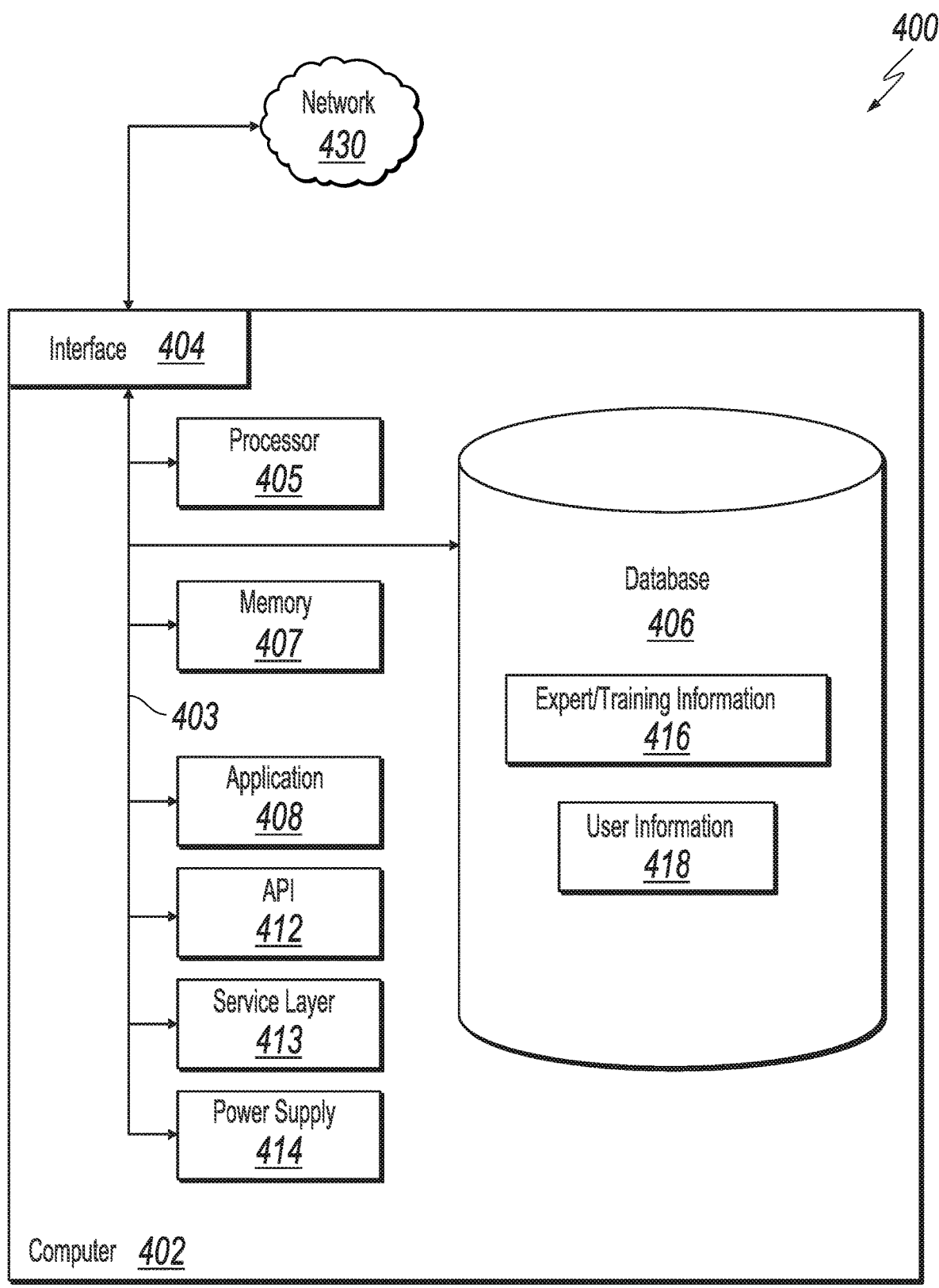
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role as a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages and providing data in a particular format (for example, extensible markup language (XML)) or a combination of formats. While illustrated as an integrated component of the Computer 402, alternative implementations can illustrate the API 412 or the Service Layer 443 as stand-alone components about other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described expert and training information 416 and user information 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method comprises: accessing user information for a particular user; accessing expert information for experts and training that is available in an organization of the particular user; determining one or more pattern matches between the user information and the expert information; generating one or more expert recommendations based on the one or more pattern matches; and providing the one or more expert recommendations.

The foregoing and other described implementations can each, optionally, include one or more of the following features:

A first feature, combinable with any of the following features, wherein the user information includes context information, organizational data for the particular user, demographic data, expert or training usage information, a user role for the particular user, project participation data, user profile information, user activity data, user preferences, a current location of the particular user, or a current time at which a recommendation can be presented to the particular user.

A second feature, combinable with any of the previous or following features, wherein the expert information includes one or more of an expert category, expert description, expert prerequisite information, expert functionality, expert availability, expert cost, expert preferences, expert profile, and expert location.

A third feature, combinable with any of the previous or following features, wherein at least one pattern match is a match between the user information and a predefined pattern relating to expert data.

A fourth feature, combinable with any of the previous or following features, wherein at least one pattern match is a match between the expert information and a predefined pattern relating to the user information.

A fifth feature, combinable with any of the previous or following features, wherein the one or more expert recommendations are generated in response to a trigger.

A sixth feature, combinable with any of the previous or following features, wherein the trigger comprises one of a change in the user information, a change in the expert information, a change in training information, or a start of a periodic interval at which to automatically process the user information, the expert information, and the training information.

A seventh feature, combinable with any of the previous or following features, further comprising storing the one or more pattern matches.

An eighth feature, combinable with any of the previous or following features, further comprising receiving feedback related to one or more provided expert recommendations; and adjusting a pattern recognition engine to improve generation of future expert recommendations.

A ninth feature, combinable with any of the previous or following features, wherein determining the one or more pattern matches comprises determining an expert to which the particular user has access.

A tenth feature, combinable with any of the previous or following features, wherein determining the one or more pattern matches comprises determining an expert that matches historical expert usage for the particular user.

An eleventh feature, combinable with any of the previous or following features, wherein determining the one or more pattern matches comprises determining an expert that matches a requirement of the particular user.

A twelfth feature, combinable with any of the previous or following features, wherein determining the one or more pattern matches comprises determining an expert that matches some of the user information but lacks knowledge or training to perform a specific task for the particular user; and including a suggestion in a provided expert recommendation that the expert obtain the knowledge or the training.

A thirteenth feature, combinable with any of the previous or following features, further comprising assessing a payment for the one or more expert recommendations if a particular expert recommendation of the one or more expert recommendations is followed by the organization.

In a second implementation, a non-transitory, computer-readable medium stores one or more instructions executable by a computer system to perform operations comprising: accessing user information for a particular user; accessing expert information for experts and training that is available in an organization of the particular user; determining one or more pattern matches between the user information and the expert information; generating one or more expert recommendations based on the one or more pattern matches; and providing the one or more expert recommendations.

The foregoing and other described implementations can each, optionally, include one or more of the following features:

A first feature, combinable with any of the following features, wherein the user information includes context information, organizational data for the particular user, demographic data, expert or training usage information, a user role for the particular user, project participation data, user profile information, user activity data, user preferences, a current location of the particular user, or a current time at which a recommendation can be presented to the particular user.

A second feature, combinable with any of the previous or following features, wherein the expert information includes one or more of an expert category, expert description, expert prerequisite information, expert functionality, expert availability, expert cost, expert preferences, expert profile, and expert location.

A third feature, combinable with any of the previous or following features, wherein at least one pattern match is a match between the user information and a predefined pattern relating to expert data.

A fourth feature, combinable with any of the previous or following features, wherein at least one pattern match is a match between the expert information and a predefined pattern relating to the user information.

A fifth feature, combinable with any of the previous or following features, wherein the one or more expert recommendations are generated in response to a trigger.

A sixth feature, combinable with any of the previous or following features, wherein the trigger comprises one of a change in the user information, a change in the expert information, a change in training information, or a start of a periodic interval at which to automatically process the user information, the expert information, and the training information.

A seventh feature, combinable with any of the previous or following features, further comprising storing the one or more pattern matches.

An eighth feature, combinable with any of the previous or following features, further comprising receiving feedback related to one or more provided expert recommendations; and adjusting a pattern recognition engine to improve generation of future expert recommendations.

A ninth feature, combinable with any of the previous or following features, wherein determining the one or more pattern matches comprises determining an expert to which the particular user has access.

A tenth feature, combinable with any of the previous or following features, wherein determining the one or more pattern matches comprises determining an expert that matches historical expert usage for the particular user.

An eleventh feature, combinable with any of the previous or following features, wherein determining the one or more pattern matches comprises determining an expert that matches a requirement of the particular user.

A twelfth feature, combinable with any of the previous or following features, wherein determining the one or more pattern matches comprises determining an expert that matches some of the user information but lacks knowledge or training to perform a specific task for the particular user; and including a suggestion in a provided expert recommendation that the expert obtain the knowledge or the training.

A thirteenth feature, combinable with any of the previous or following features, further comprising assessing a payment for the one or more expert recommendations if a particular expert recommendation of the one or more expert recommendations is followed by the organization.

In a third implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations comprising: accessing user information for a particular user; accessing expert information for experts and training that is available in an organization of the particular user; determining one or more pattern matches between the user information and the expert information; generating one or more expert recommendations based on the one or more pattern matches; and providing the one or more expert recommendations.

The foregoing and other described implementations can each, optionally, include one or more of the following features:

A first feature, combinable with any of the following features, wherein the user information includes context information, organizational data for the particular user, demographic data, expert or training usage information, a user role for the particular user, project participation data, user profile information, user activity data, user preferences, a current location of the particular user, or a current time at which a recommendation can be presented to the particular user.

A second feature, combinable with any of the previous or following features, wherein the expert information includes one or more of an expert category, expert description, expert prerequisite information, expert functionality, expert availability, expert cost, expert preferences, expert profile, and expert location.

A third feature, combinable with any of the previous or following features, wherein at least one pattern match is a match between the user information and a predefined pattern relating to expert data.

A fourth feature, combinable with any of the previous or following features, wherein at least one pattern match is a match between the expert information and a predefined pattern relating to the user information.

A fifth feature, combinable with any of the previous or following features, wherein the one or more expert recommendations are generated in response to a trigger.

A sixth feature, combinable with any of the previous or following features, wherein the trigger comprises one of a change in the user information, a change in the expert information, a change in training information, or a start of a periodic interval at which to automatically process the user information, the expert information, and the training information.

A seventh feature, combinable with any of the previous or following features, further comprising storing the one or more pattern matches.

An eighth feature, combinable with any of the previous or following features, further comprising receiving feedback related to one or more provided expert recommendations; and adjusting a pattern recognition engine to improve generation of future expert recommendations.

A ninth feature, combinable with any of the previous or following features, wherein determining the one or more pattern matches comprises determining an expert to which the particular user has access.

A tenth feature, combinable with any of the previous or following features, wherein determining the one or more pattern matches comprises determining an expert that matches historical expert usage for the particular user.

An eleventh feature, combinable with any of the previous or following features, wherein determining the one or more pattern matches comprises determining an expert that matches a requirement of the particular user.

A twelfth feature, combinable with any of the previous or following features, wherein determining the one or more pattern matches comprises determining an expert that matches some of the user information but lacks knowledge or training to perform a specific task for the particular user; and including a suggestion in a provided expert recommendation that the expert obtain the knowledge or the training.

A thirteenth feature, combinable with any of the previous or following features, further comprising assessing a payment for the one or more expert recommendations if a particular expert recommendation of the one or more expert recommendations is followed by the organization.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   accessing, by one or more processors, user information for a particular user;
   accessing, by the one or more processors, expert information for experts and training that is available in an organization of the particular user;
   determining, by the one or more processors, by using a plurality of pattern recognition algorithms, a plurality of pattern matches defining matches between the user information and a predefined pattern relating to the expert information, wherein each pattern match is weighed using an adjustable weight corresponding to a type of pattern recognition algorithm from the plurality of pattern recognition algorithms;
   generating, by the one or more processors, by using a machine learning engine, one or more expert recommendations based on the plurality of pattern matches and past user feedback;
   providing, by the one or more processors, in real time, the one or more expert recommendations corresponding to the training that is available in the organization;
   receiving, by the one or more processors, user feedback associated with the one or more expert recommendations corresponding to the training that is available in the organization; and
   updating, by the one or more processors, the machine learning engine based on the user feedback to tailor future expert recommendations.

2. The computer-implemented method of claim 1, wherein the user information comprises context information, organizational data for the particular user, demographic data, expert or training usage information, a user role for the particular user, project participation data, user profile information, user activity data, user preferences, a current location of the particular user, or a current time at which a recommendation can be presented to the particular user.

3. The computer-implemented method of claim 1, wherein the expert information comprises one or more of an expert category, expert description, expert prerequisite information, expert functionality, expert availability, expert cost, expert preferences, an expert profile, and an expert location.

4. The computer-implemented method of claim 1, wherein at least one pattern match is a match between the user information and a predefined pattern relating to expert data.

5. The computer-implemented method of claim 1, wherein at least one pattern match is a match between the expert information and a predefined pattern relating to the user information.

6. The computer-implemented method of claim 1, wherein the one or more expert recommendations are generated in response to a trigger.

7. The computer-implemented method of claim 6, wherein the trigger comprises one of a change in the user information, a change in the expert information, a change in training information, or a start of a periodic interval at which to automatically process the user information, the expert information, and the training information.

8. The computer-implemented method of claim 1, further comprising:
storing the plurality of pattern matches.

9. The computer-implemented method of claim 1, further comprising:
receiving feedback related to one or more provided expert recommendations; and
adjusting a pattern recognition engine to improve generation of future expert recommendations.

10. The computer-implemented method of claim 1, wherein determining the plurality of pattern matches comprises determining an expert to which the particular user has access.

11. The computer-implemented method of claim 1, wherein determining the plurality of pattern matches comprises determining an expert that matches historical expert usage for the particular user.

12. The computer-implemented method of claim 1, wherein determining the plurality of pattern matches comprises determining an expert that matches a requirement of the particular user.

13. The computer-implemented method of claim 1, wherein determining the plurality of pattern matches comprises:
determining an expert that matches some of the user information but lacks knowledge or training to perform a specific task for the particular user and is trainable to obtain the knowledge or the training.

14. The computer-implemented method of claim 1, further comprising:
assessing a payment for the one or more expert recommendations if a particular expert recommendation of the one or more expert recommendations is followed by the organization.

15. A non-transitory, computer-readable medium storing one or more instructions executable by a computer system to perform operations comprising:
accessing user information for a particular user;
accessing expert information for experts and training that is available in an organization of the particular user;
determining, by using a plurality of pattern recognition algorithms, a plurality of pattern matches defining matches between the user information and a predefined pattern relating to the expert information, wherein each pattern match is weighed using an adjustable weight corresponding to a type of pattern recognition algorithm from the plurality of pattern recognition algorithms;
generating, by using a machine learning engine, one or more expert recommendations based on the plurality of pattern matches and past user feedback;
providing, in real time, the one or more expert recommendations corresponding to the training that is available in the organization;
receiving user feedback associated with the one or more expert recommendations corresponding to the training that is available in the organization; and
updating the machine learning engine based on the user feedback to tailor future expert recommendations.

16. The non-transitory, computer-readable medium of claim 15, wherein the user information comprises context information, organizational data for the particular user, demographic data, expert or training usage information, a user role for the particular user, project participation data, user profile information, user activity data, user preferences, a current location of the particular user, or a current time at which a recommendation can be presented to the particular user.

17. The non-transitory, computer-readable medium of claim 15, wherein the expert information comprises one or more of an expert category, expert description, expert prerequisite information, expert functionality, expert availability, expert cost, expert preferences, an expert profile, and an expert location.

18. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
accessing user information for a particular user;
accessing expert information for experts and training that is available in an organization of the particular user;
determining, by using a plurality of pattern recognition algorithms, a plurality of pattern matches defining matches between the user information and a predefined pattern relating to the expert information, wherein each pattern match is weighed using an adjustable weight corresponding to a type of pattern recognition algorithm from the plurality of pattern recognition algorithms;
generating, by using a machine learning engine, one or more expert recommendations based on the plurality of pattern matches and past user feedback;
providing, in real time, the one or more expert recommendations corresponding to the training that is available in the organization;
receiving user feedback associated with the one or more expert recommendations corresponding to the training that is available in the organization; and
updating the machine learning engine based on the user feedback to tailor future expert recommendations.

19. The computer-implemented system of claim 18, wherein the user information comprises context information, organizational data for the particular user, demographic data, expert or training usage information, a user role for the particular user, project participation data, user profile information, user activity data, user preferences, a current location of the particular user, or a current time at which a recommendation can be presented to the particular user.

20. The computer-implemented system of claim 18, wherein the expert information comprises one or more of an expert category, expert description, expert prerequisite information, expert functionality, expert availability, expert cost, expert preferences, an expert profile, and an expert location.

* * * * *